United States Patent Office 3,850,957
Patented Nov. 26, 1974

3,850,957
2,3-DIHYDROIMIDAZO[1,2-a]INDOLES
Alan Chapman White, Windsor, and Robin Michael Black, Wraysbury, England, assignors to John Wyeth & Brother Limited, Maidenhead, Berkshire, England
No Drawing. Filed Dec. 8, 1972, Ser. No. 313,232
Claims priority, application Great Britain, Dec. 14, 1971, 1,250/71
Int. Cl. C07d 49/34
U.S. Cl. 260—309.6                    7 Claims

ABSTRACT OF THE DISCLOSURE

A group of heterocyclic compounds having antidepressant, anti-inflammatory, anti-histaminic, cardiovascular, diuretic and hypoglycaemic activity is described. The compounds are derivatives of imidazo[1,2-a]indoles or diazepino[1,2-a]indoles. They have the general formula

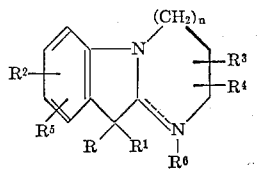

(I)

or acid addition or quaternary ammonium salts thereof, in which R represents a hydroxyl, lower alkoxy, aryl-lower alkoxy, tetrahydropyranyloxy or acyloxy group, $R^1$ represents a mono- or a bi-cyclic aryl radical or an aryl-lower alkyl, lower alkyl, lower alkenyl, lower alkynyl or amino-lower alkyl group or R and $R^1$ when taken together represent an oxo group, $R^2$ and $R^5$ which may be the same or different represent hydrogen, hydroxyl, lower alkyl, lower alkoxy, haloloweralkyl, halogen, amino or mono- or di-(lower) alkyl-amino or if R and $R^1$ together represent an oxo group $R^2$ and/or $R^5$ may also represent nitro, $R^3$ and $R^4$ which may be the same or different represent hydrogen or lower alkyl radicals or $R^3$ represents hydrogen and $R^4$ represents hydroxy, $n$ represents 0 or 2, the dotted line represents an optional bond in the position indicated and $R^6$, which is present only when the optional bond represented by the dotted line is absent, represents hydrogen or an aryl-lower alkyl, lower alkyl, lower alkenyl, lower alkynyl or acyl radical.

---

This invention relates to heterocyclic compounds and more particularly to a novel series of indole derivatives, to a process for their preparation and to pharmaceutical compositions containing them. The indole derivatives of this invention are derivatives of imidazo[1,2-a]indoles and diazepino[1,2-a]indoles.

The present invention provides an indole derivative of the general formula (I)

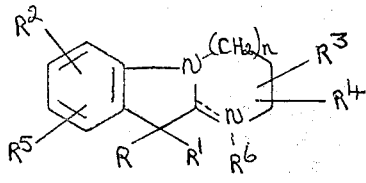

(I)

or an acid addition or quaternary ammonium salt thereof, in which R represents a hydroxyl, lower alkoxy, aryl-lower alkoxy, tetrahydropyranyloxy or acyloxy group, $R^1$ represents a mono- or a bi-cyclic aryl radical or an aryl-lower alkyl, lower alkyl, lower alkenyl, lower alkynyl or amino-lower alkyl group or R and $R^1$ when taken together represent an oxo group, $R^2$ and $R^5$ which may be the same or different represent hydrogen, hydroxyl, lower alkyl, lower alkoxy, haloloweralkyl, halogen, amino or mono- or di-(lower)alkyl-amino or if R and $R^1$ together represent an oxo group $R^2$ and/or $R^5$ may also represent nitro, $R^3$ and $R^4$ which may be the same or different represent hydrogen or lower alkyl radicals or $R^3$ represents hydrogen and $R^4$ represents hydroxy, $n$ represents 0 or 2, the dotted line represents an optional bond in the position indicated and $R^6$, which is present only when the optional bond represented by the dotted line is absent, represents hydrogen or an aryl-lower alkyl, lower alkyl, lower alkenyl, lower alkynyl or acyl radical.

Certain compounds of general formula I in which $n$ is 1 are described in co-pending U.S. application 211,105 (now abandoned) and Canadian application 130,950.

By the term "aryl" used to denote a radical or part of a radical such as aryl-lower alkyl, is meant a radical having an aromatic character. Such radicals include phenyl, naphthyl and heterocyclic radicals having an aromatic character. The term "lower" as used herein means the radical contains up to 6, preferably up to 4 carbon atoms. It is to be understood that $R^3$ and $R^4$ may be on the same or different carbon atoms, but preferably they are both on the same carbon atom, e.g. at position 2 (or 3) in the imidazo[1,2-a]indoles. The term "amino-lower alkyl" as used in connection with the radical $R^1$ means unsubstituted amino-lower alkyl or mono- or di-substituted amino lower alkyl such as alkylamino-lower alkyl, dialkylamino-lower alkyl or heterocyclo-lower alkyl.

Since the compounds of the invention may possess one or more asymmetric carbon atoms, optical enantiomorphs are possible and the compounds of the invention may be the pure enantiomorphs or mixtures of such enantiomorphs, such as the racemates.

Examples of radicals R are hydroxyl, methoxy, ethoxy, $n$-propoxy, iso-propoxy, $n$-butoxy, benzyloxy, phenethoxy, acetoxy, propionoxy, butyryloxy, benzoyloxy, substituted benzoyloxy, phenylacetoxy, methanesulphonyloxy and $p$-toluenesulphonyloxy. Examples of mono- and bi-cyclic aryl radicals $R^1$ are phenyl, naphthyl, furyl, thienyl, pyridyl, indolyl, and benzothienyl, each of which may be substituted or unsubstituted. Suitable substituents are halogen (for example fluorine, chlorine or bromine), lower alkyl (for example methyl, ethyl, propyl, or butyl), lower alkoxy (for example methoxy, ethoxy, propoxy or butoxy) and haloloweralkyl (for example trifluoromethyl). Examples of aryl-lower alkyl radicals $R^1$ are benzyl and phenethyl each of which may be substituted by those substituents defined above for the aryl groups $R^1$. Lower alkyl radicals $R^1$ may be methyl, ethyl, propyl, or butyl; alkenyl radicals may be straight or branched chain radicals and may for example be allyl or dimethylallyl; alkynyl radicals may be straight or branched chain and may for example be propargyl; and amino lower alkyl radicals may for example be dimethylamino-ethyl, dimethylamino-propyl, diethylamino-propyl, diethylaminoethyl, methylaminoethyl and methylaminopropyl, morpholinopropyl and piperidinopropyl. The following are examples of residues for $R^2$ and $R^5$: lower alkyl residues, e.g. methyl, ethyl, propyl and butyl; lower alkoxy residues, e.g. methoxy, ethoxy, propoxy and butoxy; haloloweralkyl residues may be trifluoromethyl; and halogen groups may be chlorine and bromine. Preferably $R^2$ and $R^5$ are both hydrogen or one group is hydrogen and the other is, for example, halogen. Examples of lower alkyl residues $R^3$ and $R^4$ are methyl, ethyl, propyl and butyl.

Examples of aryl-lower alkyl radicals $R^6$ are benzyl and phenethyl each of which may be substituted by those substituents defined for the aryl groups $R^1$ mentioned above. Lower alkyl radicals $R^6$ may be straight or branched chain radicals including methyl, ethyl, propyl and butyl; alkenyl radicals may be straight or branched chain radicals and may for example be allyl or dimethylallyl; alkynyl radicals may be straight or branched chain and may for example be propargyl. Acyl radicals $R^6$ may for example be formyl, acetyl, propionyl, butyryl, benzoyl, phenylacetyl or benzenesulphonyl each of which may be substituted on the aromatic ring by the substituents defined for the aryl radicals $R^1$ mentioned above or methanesulphonyl.

The preferred compounds are those of formula (I) in which $R^2$, $R^3$, $R^4$ and $R^5$ represent hydrogen atoms, R represents hydroxyl and $R^1$ represents a monocyclic aryl radical, particularly a phenyl, halophenyl or alkylphenyl radical and the dotted line represents a bond.

A preferred class of compounds of formula (I) are the imidazo[1,2-a]indoles having the general formula (Ia)

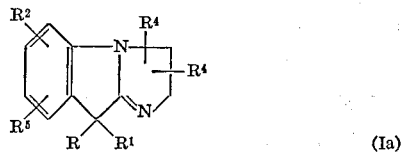

(Ia)

and their acid addition and quaternary ammonium salts, wherein R and $R^1$ have the meanings given above in connection with formula (I), $R^2$ and $R^5$ which may be the same or different represent hydrogen, hydroxyl, lower alkyl, lower alkoxy, halo(lower)alkyl or halogen and $R^3$ and $R^4$ which may be the same or different represent hydrogen or lower alkyl.

Indole derivatives of general formula (I) except those where R and $R^1$ are taken together and represent an oxo group, can be prepared by a process in which a ketone of general formula (II)

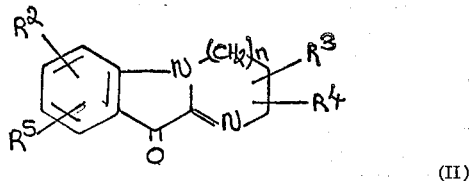

(II)

wherein $R^2$, $R^3$, $R^4$, $R^5$ and $n$ have the meanings given in connection with formula (I) except that neither $R^2$ nor $R^5$ represent nitro, is reacted with an organometallic compound known in the art for the conversion of a ketone function to the group

and, if desired, the resulting compound of formula (I) in which R represents a hydroxyl group and the dotted line represents a bond, is alkylated or acylated to give a corresponding compound in which R represents a lower alkoxy, aryl-lower alkoxy, tetrahydropyranyloxy or an acyloxy residue and again if desired the compound of general formula (I) in which the dotted line represents a bond is converted to an acid addition or quaternary ammonium salt thereof and if desired the compound in which the doted line represents a bond or its quaternary ammonium salt is reduced to give a compound of formula (I) in which the bond represented by the dotted line is absent and $R^6$ represents an aryl-lower alkyl, lower alkyl, lower alkenyl or lower alkynyl group and if desired the resulting compound is converted to an acid addition or quaternary ammonium salt thereof and if desired in any product one group R and/or $R^1$ and/or $R^2$ and/or $R^3$ and/or $R^4$ and/or $R^5$ and/or $R^6$ (if present), is converted into another group R and/or $R^1$ and/or $R^2$ and/or $R^4$ and/or $R^5$ and/or $R^6$ within the meanings defined above in connection with formula I.

In the above process the organometallic compound is preferably chosen from (a) Grignard reagents of formula $R^1MgY$ wherein Y is halogen and $R^1$ has the meanings defined above, and (b) alkali-metal compounds such as the lithium derivatives of formula $R^1Li$ (particularly the aryl lithiums, for example phenyl lithium), and sodium and potassium acetylide. The reaction with the organometallic compound is generally carried out in an inert organic solvent, for example ether or tetrahydrofuran, using the standard conditions known for the particular reaction concerned.

As already mentioned, if desired the compound in which R represents a hydroxyl group and the dotted line represents a bond in the position indicated may be alkylated or acylated to introduce a lower alkoxy, aryl-lower alkoxy, tetrahydropyranyloxy or acyloxy residue R. Such alkylation or acylation reactions are carried out by standard methods known in the art. For example, the hydroxy compound may be converted into its alkalimetal derivative, particularly the sodio derivative and then treated with the appropriate alkylating or acylating agent. Examples of alkylating agents are lower alkyl or aryl-lower alkyl halides such as the chlorides, bromides or iodides, while examples of acylating agents are acid halides (particularly the chlorides) or acid anhydrides of the aliphatic or aromatic carboxylic acids, as well as halides (particularly the chlorides) of some organically substituted inorganic acids such as the aliphatic or aromatic sulphonic acids.

The compounds of general formula (I) in which the bond represented by the dotted line is absent having the general formula (VI)

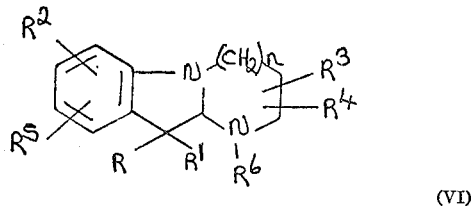

(VI)

wherein R, $R^1$, $R^2$, $R^3$, $R^4$, $R^5$, $R^6$ and $n$ have the meanings given above in connection with formula (I) except that R and $R^1$ cannot be taken together to represent an oxo group, can be prepared by reducing, for example, with a hydride transfer agent such as a complex metal hydride a compound of general formula (VII)

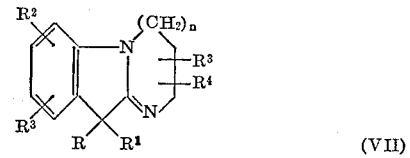

(VII)

or a quaternary ammonium salt thereof in which the cation has the formula (VIII)

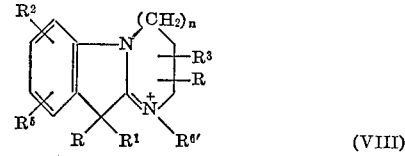

(VIII)

wherein R, $R^1$, $R^2$, $R^3$, $R^4$, $R^5$ and $n$ have the meanings given immediately above and $R^{6'}$ is an aryl-lower alkyl, lower alkyl, lower alkenyl or lower alkynyl radical, and if desired converting one group R and/or $R^1$ and/or $R^2$ and/or $R^5$ and/or $R^6$ within the above defined meanings of R, $R^1$, $R^2$, $R^5$ and $R^6$ or, if desired converting a free base into an acid addition or quaternary ammonium salt thereof.

For example, when it is desired to prepare a compound of general formula (Ic) in which R, $R^1$, $R^2$, $R^3$, $R^4$, and $R^5$ have the meanings defined in connection with formula (VI) and $R^6$ represents hydrogen, a compound of general formula (Ia) in which R, $R^1$, $R^2$, $R^3$, $R^4$ and $R^5$ have the meanings defined above in connection with formula (VI) may be reduced by methods known in the art. Preferably the reduction is effected by means of a hydride transfer reagent, particularly a complex metal hydride such as sodium borohydride or lithium aluminium hydride. The reaction is conducted using the standard conditions known for the particular reducing agent concerned.

Once a compound of general formula (I) has been prepared in which R, $R^1$, $R^2$, $R^3$, $R^4$, $R^5$ and $R^6$ have the meanings defined in connection with formula (I), one group R and/or $R^1$ and/or $R^2$ and/or $R^3$ and/or $R^4$ and/or $R^5$ and/or $R^6$ (if present) may, if desired, be converted into another group R and/or $R^1$ and/or $R^2$ and/or $R^3$ and/or $R^4$ and/or $R^5$ and/or $R^6$ each within the above defined meanings of R, $R^1$, $R^2$, $R^3$, $R^4$, $R^5$ and $R^6$. For example, when $R^2$ and/or $R^5$ is a hydrogen atom, this may be converted into a halogen or nitro group by known methods. Furthermore, when $R^2$ and/or $R^5$ is a lower alkoxy radical (particularly a methoxy radical), this may be de-etherified by known methods to give the corresponding hydroxyl radical $R^2$ and/or $R^5$ or conversely a hydroxyl radical $R^2$ and/or $R^5$ may be alkylated by known methods to give a lower alkoxy radical $R^2$ and/or $R^5$. When $R^1$ is an alkynyl radical, this may be reduced to an alkenyl radical $R^1$. A dimethylaminoalkyl radical $R^1$ may be mono-demethylated to give the corresponding methylaminoalkyl radical. If desired a hydroxyl function R may be alkylated or acylated to form a lower alkoxy, aryl-lower alkoxy or acyloxy residue R by the methods described hereinbefore.

When $R^6$ is a hydrogen atom, the compound may be alkylated or acylated by known methods to introduce a group $R^6$ other than hydrogen. If necessary, any reactive group in a compound may be protected by known methods before performing any of the above reactions and then removed by known methods subsequent to the reaction.

The ketone starting materials of the general formula (II) can be prepared by cyclisation of a ketone of general formula (III)

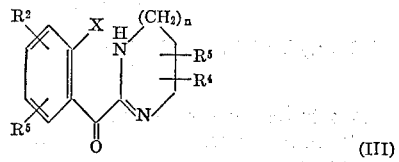

where $R^2$, $R^3$, $R^4$, $R^5$ and $n$ have the meanings given above in connection with formula (II) and X is halo and, if desired, conversion of one group $R^2$ and/or $R^5$ into another group $R^2$ and/or $R^5$ by known methods.

The ketone of general formula (III) can be cyclised by a modified Ullmann reaction. For example, the ketone may be treated with a metallic agent such as copper or a salt thereof, especially cupric oxide or cuprous chloride. The reaction is generally carried out in the presence of a base such as an alkaline metal carbonate (e.g. potassium carbonate), triethylamine or N-ethylmorpholine and preferably in a solvent (e.g. dimethylacetamide, pyridine, hexamethylphosphoric triamide or preferably dimethylformamide).

The group X is preferably bromo and, in the ketone of general formula (IV) $R^2$ and $R^3$ are preferably hydrogen, or electron-attracting groups such as halogen.

The ketones of general formula (III) can be prepared by oxidation of the corresponding hydroxy compounds of general formula (IX)

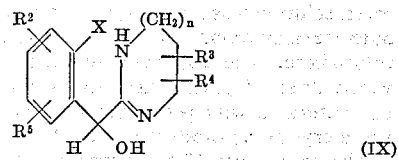

wherein $R^2$, $R^3$, $R^4$, $R^5$, $n$ and X have the meanings given above. Preferably the oxidation is carried out with a mild oxidising agent such as manganese dioxide (for example, in solvents such as dichloromethane, chloroform, benzene, acetone or aqueous acetone) or lead tetraacetate (for example, in pyridine). The compound of formula (IX) in which $R^3$ is hydrogen and $R^4$ is hydroxy may be selectively oxidised to the compound of general formula (III) in which $R^3$ and $R^4$ have the same meanings by the use of suitable mild oxidising agents such as precipitated manganese dioxide.

The compounds of general formula (IX) are described in the literature or may be prepared from known compounds by known methods. For example they may be prepared by the method described by Neilson et al., J. Chem. Soc. (C), 1968, 1853.

The compounds of formula (I) are capable of forming quaternary ammonium salts, and the invention also provides such salts. The quaternary salts may be prepared by treating the compound as its base in the presence or absence of a solvent, with an aryl-lower alkyl halide, lower alkyl halide, alkenyl halide or alkynyl halide. Examples of such halides are methyl iodide and benzyl chloride and benzyl bromide.

The optical isomers of the compounds of formula (I) may be prepared by several processes. Preferably, a racemic mixture of a compound of the general formula (I) is resolved by standard methods described in the literature. The racemate may be prepared by any of the processes outlined above. It is to be understood that the resolution may be carried out on the racemic mixture of the final desired product, or it may be carried out on racemate of one compound of general formula (I) and then the optical isomers subjected to after-processes (such as alkylation, acylation, hydrolysis, hydrogenolysis, and reduction) to give the desired product of formula (I).

Alternatively, an optically active isomer of a compound of the general formula (I) can be prepared by any of the methods outlined above employing an optically active starting material, or a resolution can be carried out at any stage prior to formation of the compound of general formula (I). If necessary the optically active isomer thus formed may be subjected to such reactions as alkylation, acylation, hydrolysis, hydrogenolysis, and reduction, to give the desired product.

A resolution is preferably carried out on a racemic mixture of a basic compound of general formula (I) by methods described in the literature, such as by use of an optically active acid. For instance, a solution of the racemate in a suitable solvent such as an alcohol is treated with a solution of an optically active acid to cause crystallisation of the salt of one particular enantiomorph. The other enantiomorph can often be obtained from the mother liquors, or if necessary by treatment with a base and then with the other optical isomer of the optically active acid, or alternatively a fresh solution of the racemate can be treated with a solution of the other enantiomorph of the optically active acid. The actual solvent and optically active acid to be used in any one instance can be determined by routine experiment. The best combination is that which allows the salt to be most easily isolated in a high state of purity (i.e. freedom from the other enantiomer) and in a crystalline form.

The compounds of general formula (I) exhibit pharmacological activity or are intermediates for other compounds of general formula (I) exhibiting such activity. In particular, many of the compounds possess one or more of the following activities as shown by standard tests on warm-blooded animals: anti-depressant, anti-inflammatory, anti-histaminic, cardiovascular, diuretic and hypoglycaemic.

As the compounds of general formula (I) generally show pharmaceutical activity the invention further provides a pharmaceutical composition which comprises a pharmaceutically active form of a compound provided by the invention which may be micronised, in association with a pharmaceutically acceptable carrier. Any suitable carrier known in the art can be used to prepare the pharmaceutical compositions. In such a composition, the carrier may be a solid, liquid or mixture of a solid and a liquid. Solid form compositions include powders, tablets and capsules. A solid carrier can be one or more substances which may also act as flavoring agents, lubricants, solubilisers, suspending agents, binders or tablet-disintegrating agents; it can also be an encapsulating material. In powders the carrier is a finely divided solid which is in admixture with the finely divided active ingredient. In tablets the active ingredient is mixed with a carrier having the necessary binding properties in suitable proportions and compacted in the shape and size desired. The powders and tablets preferably contain from 5 to 99, preferably 10–80% of the active ingredient. Suitable solid carriers are magnesium carbonate, magnesium stearate, talc, sugar, lactose, pectin, dextrin, starch gelatin, tragacanth, methyl cellulose, sodium carboxymethyl cellulose, a low melting wax, and cocoa butter. The term "composition" is intended to include the formulation of an active ingredient with encapsulating material as carrier to give a capsule in which the active ingredient (with or without other carriers) is surrounded by carrier, which is thus in association with it. Similarly cachets are included.

Sterile liquid form compositions include sterile solutions, suspensions, emulsions, syrups and elixirs. The active ingredient can be dissolved or suspended in a pharmaceutically acceptable sterile liquid carrier, such as sterile water, sterile organic solvent or a mixture of both. Preferably a liquid carrier is one suitable for parenteral injection. Where the active ingredient is sufficiently soluble it can be dissolved in normal saline as a carrier; if it is too insoluble for this it can often be dissolved in a suitable organic solvent, for instance aqueous propylene glycol or polyethylene glycol solutions. Aqueous propylene glycol containing from 10 to 75% of the glycol by weight is generally suitable. In other instances compositions can be made by dispersing the finely-divided active ingredient in aqueous starch or sodium carboxymethyl cellulose solution, or in a suitable oil, for instance arachis oil. Liquid pharmaceutical compositions which are sterile solutions or suspensions can be utilised by intramuscular, intraperitoneal or subcutaneous injection. In many instances a compound is orally active and can be administered orally either in liquid or solid composition form.

Preferably the pharmaceutical composition is in unit dosage form. In such form, the composition is sub-divided in unit dose containing appropriate quantities of the active ingredient; the unit dosage form can be a packaged composition, the package containing specific quantities of compositions, for example packeted powders or vials or ampoules. The unit dosage form can be a capsule or tablet itself, or it can be the appropriate number of any of these in packaged form. The quantity of active ingredient in a unit dosae of composition may be varied or adjusted from 5 mg. or less to 500 mg. or more, according to the particular need and the activity of the active ingredient. The invention also includes the compounds in the absence of carrier where the compounds are in unit dosage form.

The following examples illustrate the invention:

EXAMPLE 1

2,3-di-hydro-2,2(or 3,3)-dimethylimidazo[1,2-a]-indol-[9H]-9-one (a) A solution of ethyl o-bromomandelimidate hydrochloride (29.4 g., 0.1 mole) and 1,2-diamino-2-methyl propane (8.8 g., 0.1 mole) in absolute ethanol (150 ml.) was heated under reflux for 5 hours. Removal of the solvent and crystallisation of the residue from isopropanol/ether yielded a crude hydrochloride (23.4 g.). An aqueous solution of the crude hydrochloride was basified (NaOH) with simultaneous scratching of the flask to yield α-(o-bromophenyl - 4,4(or 5,5) - dimethyl-2-imidazolinemethanol as the crystalline free base (16.2 g., m.p. 128–130°). Alternatively the free base may be extracted into chloroform, the extracts dried (MgSO$_4$), and the residue, after removal of the solvent, triturated with petroleum (60–80°).

An analytical sample of the hydrochloride was prepared by acidifying a solution of the free base in isopropanol with ethereal HCl, m.p. 213–217°. [Found: C, 45.35; H, 5.05; N, 8.6%; $C_{12}H_{15}BrN_2O \cdot HCl$ requires C, 45.1, H, 5.05; N, 8.75%.]

(b) A solution of α-(o-bromophenyl)-4,4(or 5,5)-dimethyl-2-imidazolinemethanol (15.8 g.) in dichloromethane (750 ml.) was stirred with precipitated manganese dioxide (150 g.) at room temperature for 40 hours. The manganese dioxide was filtered and stirred with a further portion of dichloromethane (400 ml.) for 1 hour. After filtering the combined filtrates were dried (MgSO$_4$), the solvent removed and the residue recrystallised from petroleum (b.p. 60–80°) to yield o-bromophenyl 4,4(or 5,5) - dimethyl - 2 - imidazolinyl ketone (11.01 g., m.p. 107–108°). [Found: C, 51.25; H, 4.85; N, 10.05%; $C_{12}H_{13}BrN_2O$ requires C, 51.25; H, 4.65; N, 9.95%.]

(c) A solution of o-bromophenyl-4,4(or 5,5)-dimethyl-2-imidazolinyl ketone (0.7 g., 0.0025 mole) in dry dimethylformamide (5 ml.) was stirred with anhydrous potassium carbonate (0.345 g., 0.0025 mole) and cupric oxide (0.030 g.) under dry nitrogen at 125° C. for 1½ hours. The reaction mixture was diluted with benzene (100 ml.), filtered, the filtrate washed with water (4× 50 ml.) and dried (MgSO$_4$). Removal of the solvent under reduced pressure and crystallisation of the residue from cyclohexane yielded the title compound as deep crimson needles (0.244 g.), m.p. 136–138°. [Found: C, 71.7; H, 6.1; N, 13.9%; $C_{12}H_{12}N_2O$ requires C, 72.0; H, 6.05; N, 14.0%.] The hydrochloride crystallised as orange prisms from ethanol/ethereal HCl, dec. >ca. 230°. [Found: C, 56.8; H, 6.2; N, 10.95%; $C_{12}H_{12}N_2O \cdot HCl$ requires C, 56.6; H, 5.95; N, 11.0%.]

EXAMPLE 2

2,3-dihydro-2,2(or 3,3)-dimethylimidazo[1,2-a]-indol-[9H]-9-one

A solution of o-chlorophenyl 4,4(or 5,5)-dimethyl-2-imidazolinyl ketone (0.59 g., 0.0025 mole; prepared in a manner analogous to that described in Example 1 steps (a) and (b) for the corresponding o-bromophenyl compound) in dry dimethylformamide (5 ml.) was stirred with anhydrous potassium carbonate (0.345 g., 0.0025 mole) and cuprous chloride (0.030 g.) under dry nitrogen at 125° for 3 hours. The reaction was worked up as described in Example 1 step (c) to yield the product (0.255 g., m.p. 136–138°).

EXAMPLE 3

9-(m-chlorophenyl)-2,3-dihydro-2,2(or 3,3)-dimethyl-imidazo[1,2-a]indol-9[H]-9-ol To a stirred solution of m-chlorophenyllithium [prepared from m-bromochlorobenzene (9.6 g., 0.05 mole) and a 1.67 M solution of n-butyllithium in pentane (27 ml., 0.045 mole)] in dry ether (25 ml.) under nitrogen at 0° C. was added 2,3-dihydro-2,2(or 3,3)-dimethyl-imidazo[1,2-a]indol-[9H]-9-one (3.0 g., 0.015 mole) in dry tetrahydrofuran (50 ml.) over five minutes. The dark green solution was stirred for 30 minutes at 0° C., poured onto ice/ammonium chloride solution and extracted with chloroform. The combined extracts were washed with water, dried (MgSO$_4$), the solvent removed and the residue triturated with petroleum (b.p. 60–80°) to yield the white crystalline product (4.01 g.).

The crude base (3.5 g.) was dissolved in a small volume of ethanol, acidified with ethereal HCl, diluted with a large volume of ether and the hydrochloride allowed to crystallise (yield 3.72 g., dec. >ca. 205°). [Found: C, 61.9; H, 5.3; N, 8.0%; $C_{18}H_{17}ClN_2O \cdot HCl$ requires C, 61.9; H, 5.2; N, 8.0%.]

9-(p-chlorophenyl) - 2,3 - dihydro-2,2(or 3,3-dimethyl-imidazo[1,2-a]indol-9[H]-9-ol, m.p., dec. >ca. 215° and 2,3-dihydro-2,2(or 3,3)-dimethyl-9-phenylimidazo[1,2-a]indol-9[H]-9-ol, m.p. dec. >ca. 240°, were prepared in an analogous manner by reaction of p-chlorophenyllithium or phenyllithium with 2,3-dihydro-2,2(or 3,3)-dimethyl-imidazo [1,2-a]indol-[9H]-9-one.

EXAMPLE 4

2,3-dihydroimidazo[1,2-a]indol-[9H]-9-one (a) A solution of α-(o-bromophenyl)-2-imidazoline-methanol (16.0 g.) in acetone (160 ml.) was stirred with precipitated manganese dioxide (100 g.) [previously de-activated by stirring with water] for 24 hours. After filtering and washing the manganese dioxide with acetone, the solution was evaporated to a small volume under reduced pressure, diluted with water and extracted with chloroform. The combined extracts were dried (MgSO$_4$), the solvent removed and the residue allowed to crystallise from a small volume of ether to yield crude o-bromo-phenyl 2-imidazolinyl ketone (11.5 g.). A sample recrystallised from benzene-petroleum (b.p. 60–80°) had m.p 149–151°. [Found: C, 47.9; H, 3.7; N, 11.1%; $C_{10}H_9N_2BrO$ requires C, 47.5; H, 3.6; N, 11.1%.]

(b) A solution of o-bromophenyl 2-imidazolinyl ketone (0.63 g., 0.0025 mole) in dry DMF (5 ml.) was stirred with potassium carbonate (0.35 g., 0.0025 mole) and cupric oxide (0.030 g.) under dry nitrogen at 140° C. for ½ hour. The mixture was diluted with benzene (100 ml.), filtered and the filtrate washed with water (4× 50 ml.). Removal of the solvent and crystallisation of the residue from cyclohexane gave the product as red needles (0.131 g.), dec. >ca. 100° C. [Found: C, 70.2; H, 4.7; N, 16.4%; $C_{10}H_8N_2O$ requires C, 69.8; H, 4.7; N, 16.3%.]

EXAMPLE 5

2,3-dihydro-9-phenylimidazo[1,2-a]indol-9[H]-9-ol hydrochloride

A solution of 2,3-dihydroimidazo[1,2-a]indol-9[H]-9-one (1.2 g.) in dry tetrahydrofuran (20 ml.) was added to a stirred solution of phenylmagnesium bromide [made from magnesium (0.36 g., 0.015 mole) and bromobenzene (2.36 g., 0.015 mole)] in dry tetrahydrofuran (20 ml.). The mixture was heated under reflux for 2 hr., stirred overnight at room temperature and then poured onto ice/ammonium chloride solution; after extracting with chloroform, the combined extracts were dried (MgSO$_4$), the solvent removed and the residue triturated with ether to give the crude base. The crude base was dissolved in a little methanol, acidified with ethereal hydrochloric acid and diluted with ether to yield the crude hydrochloride. A further crystallisation from methanol/ether yielded the pure product (1.01 g.), dec. >ca. 210°. [Found: C, 67.15; H, 5.4; N, 9.9%; $C_{16}H_{14}N_2O \cdot HCl$ requires C, 67.0; H, 5.3; N, 9.8%.]

EXAMPLE 6

9-(m-chlorophenyl)-2,3-dihydroimidazo[1,2-a]indol-9[H]-9-ol hydrochloride

A solution of 2,3 - dihydroimidazo[1,2 - a]indol - 9-[H] - 9 - one (1.2 g.) in dry tetrahydrofuran (20 ml.) was added to a stirred solution of m-chlorophenylmagnesium bromide (0.015 mole) in dry tetrahydrofuran (20 ml.). The mixture was heated under reflux for 2 hr., stirred overnight and worked up as in Example 5 to yield the title compound (0.87 g., dec. >ca. 205°). [Found: C, 59.4; H, 4.2; N, 8.65%; $C_{16}H_{13}ClN_2O \cdot HCl$ requires C, 59.8; H, 4.4; N, 8.75%.]

EXAMPLE 7

9-p-(chlorophenyl)-2,3-dihydroimidazo[1,2-a]indol-9[H]-9-ol hydrochloride 2,3 - dihydroimidazo[1,2 - a]indol - 9[H] - 9 - one (1.2 g.) was reacted with p-chlorophenylmagnesium bromide (0.015 mole) as in Example 6 to give the required compound (1.03 g.), dec. >ca. 210°. [Found: C, 59.9; H, 4.1; N, 8.5%; $C_{16}H_{13}ClN_2O \cdot HCl$ requires C, 59.8; 4.4; N, 8.75%.]

What is claimed is:

1. A compound selected from the group consisting of bases having the formula

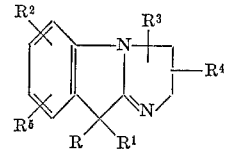

and the acid addition salts of said bases with pharmaceutically acceptable acids, wherein R represents hydroxy or lower alkoxy, $R^1$ represents phenyl or phenyl mono-substituted with halo, lower alkyl, lower alkoxy or trifluoromethyl, $R^2$ and $R^5$, are selected from the group consisting of hydrogen, hydroxyl, lower alkyl, lower alkoxy, halo (lower) alkyl and halogen, and $R^3$ and $R^4$ are selected from the group consisting of hydrogen and lower alkyl.

2. An indole derivative according to Claim 1 which is 9 - (m - chlorophenyl) - 2,3 - dihydro - 2,2(or 3,3)-dimethylimidazo[1,2-a]indol-9[H]-9-ol.

3. An indole derivative according to Claim 1 which is 9 - (p-chlorophenyl) - 2,3 - dihydro - 2,2(or 3,3) - dimethylimidazo[1,2-a]indol-9[H]-9-ol.

4. An indole derivative according to Claim 1 which is 2,3-dihydro-2,2(or 3,3)-dimethyl-9-phenylimidazo[1,2-a]indol-9[H]-9-ol.

5. An indole derivative according to Claim 1 which is 2,3 - dihydro - 9 - phenylimidazo[1,2 - a]indol - 9[H]-9-ol.

6. An indole derivative according to Claim 1 which is 9 - (m-chlorophenyl) - 2,3 - dihydroimidazo[1,2 - a]-indol-9[H]-9-ol.

7. An indole derivative according to Claim 1 which is 9 - (p - chlorophenyl) - 2,3 - dihydroimidazo[1,2 - a]-indol-9[H]-9-ol.

References Cited
UNITED STATES PATENTS

| | | | |
|---|---|---|---|
| 3,526,636 | 9/1970 | Houlihan | 260—309 |
| 3,555,042 | 1/1971 | Sulkowski | 260—309.7 |
| 3,586,693 | 6/1971 | Bell | 260—309 |
| 3,597,445 | 8/1971 | Houlihan et al. | 260—309.6 |
| 3,565,902 | 2/1971 | Wright | 260—309.7 |
| 3,641,030 | 2/1971 | Freed et al. | 260—309.7 |

NATALIE TROUSOF, Primary Examiner

U.S. Cl. X.R.

260—239 B, 251 A, 251 R, 256.4 F, 256.4 H, 309.7, 326.5 B, 326.85, 326.9; 424—251, 273, 274